(12) United States Patent
Kwon et al.

(10) Patent No.: US 10,535,465 B1
(45) Date of Patent: Jan. 14, 2020

(54) MULTILAYER CERAMIC CAPACITOR INCLUDING DIELECTRIC LAYERS WITH DIFFERENT REGIONS HAVING DIFFERENT CONCENTRATIONS OF DYSPROSIUM

(71) Applicant: SAMSUNG ELECTRO-MECHANICS CO., LTD., Suwon-si, Gyeonggi-do (KR)

(72) Inventors: Hyung Soon Kwon, Suwon-si (KR); Kyoung Jin Cha, Suwon-si (KR); Ji Hong Jo, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/279,117

(22) Filed: Feb. 19, 2019

Related U.S. Application Data

(63) Continuation of application No. 16/139,632, filed on Sep. 24, 2018.

(30) Foreign Application Priority Data

Aug. 3, 2018 (KR) .......................... 10-2018-0090641

(51) Int. Cl.
*H01G 4/12* (2006.01)
*H01G 4/30* (2006.01)

(52) U.S. Cl.
CPC ............. *H01G 4/1227* (2013.01); *H01G 4/12* (2013.01); *H01G 4/1209* (2013.01); *H01G 4/30* (2013.01)

(58) Field of Classification Search
CPC combination set(s) only.
See application file for complete search history.

(56) References Cited

U.S. PATENT DOCUMENTS

| | | | |
|---|---|---|---|
| 2001/0055193 A1* | 12/2001 | Chazono | H01G 4/1209 361/311 |
| 2004/0145856 A1* | 7/2004 | Nakamura | H01G 4/1227 361/311 |

(Continued)

FOREIGN PATENT DOCUMENTS

| | | |
|---|---|---|
| JP | 2001-230149 A | 8/2001 |
| JP | 2008-222520 A | 9/2008 |

(Continued)

OTHER PUBLICATIONS

Office Action issued in corresponding Korean Application No. 10-2018-0090641 dated Nov. 14, 2019, with English translation.

*Primary Examiner* — David M Sinclair
(74) *Attorney, Agent, or Firm* — Morgan, Lewis & Bockius LLP

(57) ABSTRACT

A multilayer ceramic capacitor includes a ceramic body with first and second internal electrodes facing each other and dielectric layers interposed therebetween. First and second external electrodes are on external surfaces of the ceramic body and electrically connected to the first and second internal electrodes, respectively. A dielectric layer includes dielectric grains including, respectively, first regions in which dysprosium (Dy) is not present and second regions surrounding the first regions. Where a shortest distance between boundaries of the first regions (in which dysprosium (Dy) is not present) of two of the dielectric grains is "L," the concentration of dysprosium (Dy) in a region within ±0.2L from a halfway point between the boundaries is lower than that of dysprosium (Dy) in the second regions.

23 Claims, 2 Drawing Sheets

(56) References Cited

U.S. PATENT DOCUMENTS

| | | | |
|---|---|---|---|
| 2008/0115876 A1* | 5/2008 | Komatsu | C04B 35/4682 |
| | | | 156/89.14 |
| 2008/0226944 A1* | 9/2008 | Aman | C04B 35/4682 |
| | | | 428/697 |
| 2008/0266751 A1* | 10/2008 | Yamazaki | C04B 35/4682 |
| | | | 361/321.4 |
| 2009/0225494 A1* | 9/2009 | Yamazaki | B32B 18/00 |
| | | | 361/321.4 |
| 2012/0050941 A1* | 3/2012 | Murakawa | C04B 35/4682 |
| | | | 361/321.1 |
| 2012/0238438 A1* | 9/2012 | Endo | C04B 35/465 |
| | | | 501/152 |
| 2013/0222968 A1* | 8/2013 | Koga | C01G 23/006 |
| | | | 361/301.4 |
| 2015/0049413 A1* | 2/2015 | Wada | H01G 4/12 |
| | | | 361/301.4 |
| 2018/0182549 A1* | 6/2018 | Koide | C04B 35/638 |

FOREIGN PATENT DOCUMENTS

| | | |
|---|---|---|
| JP | 2009-161417 A | 7/2009 |
| JP | 2011-256091 A | 12/2011 |

* cited by examiner

MULTILAYER CERAMIC CAPACITOR INCLUDING DIELECTRIC LAYERS WITH DIFFERENT REGIONS HAVING DIFFERENT CONCENTRATIONS OF DYSPROSIUM

CROSS REFERENCE

This application is the continuation application of U.S. patent application Ser. No. 16/139,632 filed Sep. 24, 2018, which claims the benefit of Korean Application No. 10-2018-0090641 filed Aug. 3, 2018, the entire contents of each are hereby incorporated by reference.

BACKGROUND

1. Field

The present disclosure relates to a multilayer ceramic capacitor capable of having improved reliability.

2. Description of Related Art

Generally, electronic components using a ceramic material, such as capacitors, inductors, piezoelectric elements, varistors, thermistors, and the like, include a ceramic body formed of the ceramic material, internal electrodes in the ceramic body, and external electrodes on surfaces of the ceramic body and connected to the internal electrodes.

Recently, as electronic products have become miniaturized and multifunctional, multilayer ceramic electronic components have tended to be miniaturized and multifunctionalized. Therefore, there has been demand for a multilayer ceramic capacitor with a small size and high capacitance.

One way to simultaneously accomplish miniaturization and increase the capacitance of the multilayer ceramic capacitor, is to increase the number of dielectric layers and electrode layers stacked in the multilayer ceramic capacitor by decreasing the thicknesses of the dielectric layers and the electrode layers. Currently, the thickness of dielectric layer is about 0.6 µm, and technology for further decreasing the thickness of dielectric layers is being continuously developed.

In this situation, it has become important to secure withstand voltage characteristics of the dielectric layer and reduce the defect rate caused by deterioration of the insulation resistance of the dielectric.

In order to solve such a problem, there is a need for a method that is capable of securing high reliability in terms of a composition of the dielectric as well as a structure of the multilayer ceramic capacitor.

Furthermore, in order to secure reliability of the dielectric layer of the multilayer ceramic capacitor, a large amount of rare earth elements such as dysprosium (Dy) are added. Dysprosium (Dy) mainly replaces the A-site of barium titanate ($BaTiO_3$) to decrease the concentration of oxygen vacancies, thereby configuring a shell region. The shell region serves as a barrier blocking a flow of electrons at a grain boundary of a dielectric grain to block leaked current.

In order for dysprosium (Dy) to effectively decrease the concentration of oxygen vacancies and serve as a leaked current barrier, it is necessary to accurately control the concentration of dysprosium (Dy) in each position of the dielectric grain.

SUMMARY

An aspect of the present disclosure may provide a multilayer ceramic capacitor capable of having improved reliability.

According to an aspect of the present disclosure, a multilayer ceramic capacitor may include a ceramic body including first and second internal electrodes facing each other with dielectric layers interposed therebetween. First and second external electrodes are on external surfaces of the ceramic body and electrically connected to the first and second internal electrodes, respectively. The dielectric layer includes dielectric grains including, respectively, first regions in which dysprosium (Dy) is not present, and second regions surrounding the first regions. Where a shortest distance between boundaries of the first regions (in which dysprosium (Dy) is not present) of two of the dielectric grains is "L," the concentration of dysprosium (Dy) in a region within ±0.2L from a halfway point between the boundaries is lower than the concentration of dysprosium (Dy) in the second regions.

According to another aspect of the present disclosure, a multilayer ceramic capacitor may include a ceramic body including first and second internal electrodes facing each other with dielectric layers interposed therebetween. The dielectric layer includes dielectric grains having a core-shell structure. The dielectric grains include first regions in their cores in which dysprosium (Dy) is not present. The dielectric grains include second regions outside of and surrounding the first regions. Where a shortest distance between boundaries of the first regions (in which dysprosium (Dy) is not present) of two of the dielectric grains is "L," the concentration of dysprosium (Dy) in a region within ±0.2L from a halfway point between the boundaries is lower than the concentration of dysprosium (Dy) in the second regions.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
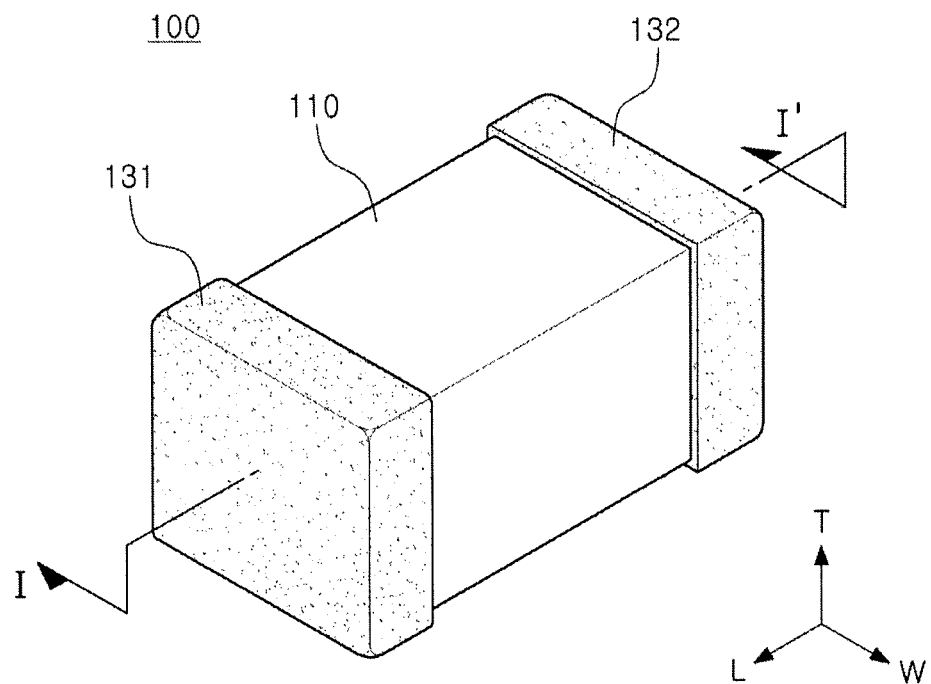
FIG. 1 is a schematic perspective view illustrating a multilayer ceramic capacitor according to an exemplary embodiment in the present disclosure.

FIG. 1 is a schematic perspective view illustrating a multilayer ceramic capacitor according to an exemplary embodiment in the present disclosure.

Figure 2:
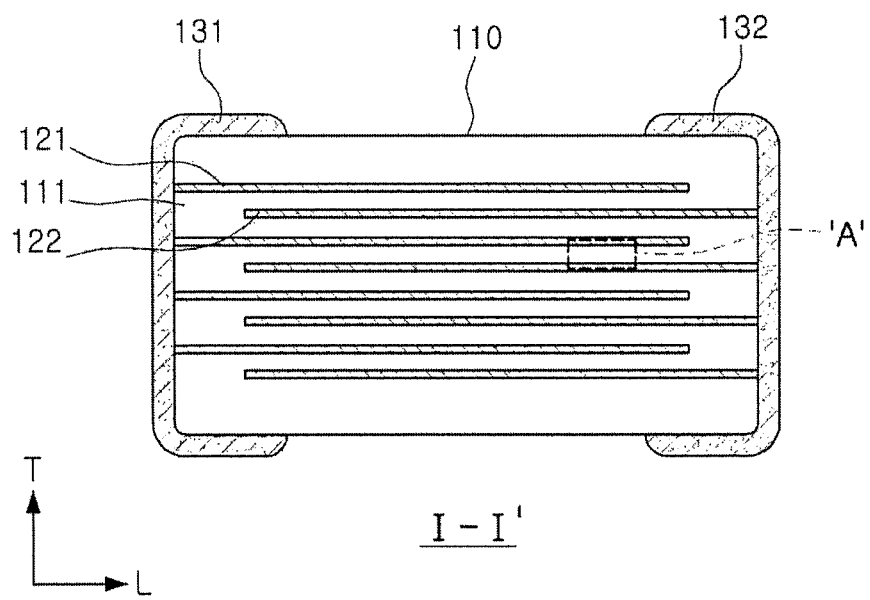
FIG. 2 is a cross-sectional view taken along line I-I' of FIG. 1.

FIG. 2 is a cross-sectional view taken along line I-I' of FIG. 1.

Figure 3:
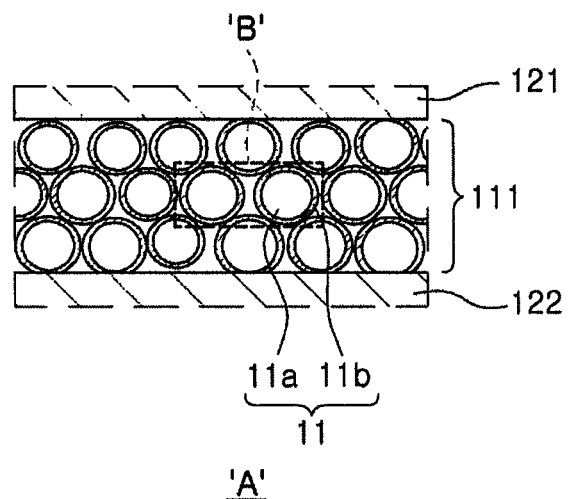
FIG. 3 is an enlarged view of region 'A' of FIG. 2.
Figure 4:
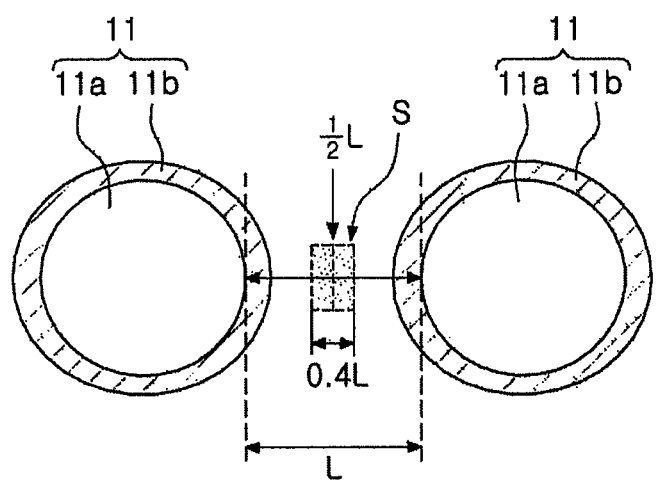
FIG. 4 is an enlarged view of region 'B' of FIG. 3.

FIG. 3 is an enlarged view of region 'A' of FIG. 2. FIG. 4 is an enlarged view of region 'B' of FIG. 3.

Referring to FIGS. 1 through 4, a multilayer ceramic capacitor 100 according to the present exemplary embodiment may include a ceramic body 110, a plurality of first and second internal electrodes 121 and 122 in the ceramic body 110, and first and second external electrodes 131 and 132 on external surfaces of the ceramic body 110.

In the multilayer ceramic capacitor 100 according to an exemplary embodiment in the present disclosure, the "length direction" refers to the "L" direction of FIG. 1, the "width direction" refers to the "W" direction of FIG. 1, and the "thickness direction" refers to the "T" direction of FIG. 1. Here, the "thickness direction" refers to a direction in which the dielectric layers are stacked, that is, the "stacked direction."

The shape of the ceramic body 110 is not particularly limited, but may be a rectangular parallelepiped shape as illustrated.

Respective ends of the plurality of internal electrodes 121 and 122 in the ceramic body 110 may be exposed at opposing surfaces of the ceramic body.

The internal electrodes includes first internal electrodes 121 and second internal electrodes 122, which may have different polarities.

Ends of the first internal electrodes 121 may be exposed at a first side surface of the ceramic body in the length direction, and ends of the second internal electrodes 122 may be exposed at a second side surface, opposing the first side surface of the ceramic body in the length direction.

The first and second external electrodes 131 and 132 may be formed, respectively, on the first and second side surfaces of the ceramic body 110, and may be electrically connected to the respective internal electrodes.

The material of each of the first and second internal electrodes 121 and 122 is not particularly limited, but may be a conductive paste including one or more of silver (Ag), lead (Pb), platinum (Pt), nickel (Ni), and copper (Cu).

The first and second external electrodes 131 and 132 may be electrically connected to the first and second internal electrodes 121 and 122, respectively, in order to form a capacitance. The second external electrode 132 may be connected to a different potential than the first external electrode 131.

The conductive material contained in each of the first and second external electrodes 131 and 132 is not particularly limited, but may be nickel (Ni), copper (Cu), or alloys thereof.

The thicknesses of the first and second external electrodes 131 and 132 may be appropriately determined depending on the purpose, or the like, and may be, for example, 10 to 50 µm, but are not particularly limited thereto.

According to an exemplary embodiment in the present disclosure, the raw material for the dielectric layer 111 is not particularly limited as long as a sufficient capacitance may be obtained. For example, the raw material for the dielectric layer 111 may be barium titanate (BaTiO$_3$) powder particles.

The material of the dielectric layer 111 may be prepared by adding various ceramic additives, organic solvents, plasticizers, binders, dispersants, and the like, to powder particles such as the barium titanate (BaTiO$_3$) powder particles, or the like, according to an object of the present disclosure.

The dielectric layers 111 may be in a sintered state, and adjacent dielectric layers may be integrated with each other so that boundaries therebetween are not readily apparent.

The first and second internal electrodes 121 and 122 may be formed on dielectric layers 111, such that the first and second internal electrodes 121 and 122 are formed in the ceramic body with dielectric layers interposed therebetween, by sintering.

The thickness of each of the dielectric layers 111 may be selected depending on the desired capacitance of the multilayer ceramic capacitor. In an exemplary embodiment in the present disclosure, the thickness of one dielectric layer after sintering may be 0.4 µm or less.

In addition, the thickness of each of the first and second internal electrodes 121 and 122 after sintering may be 0.4 µm or less.

Referring to FIG. 3, the dielectric layer 111 may include dielectric grains 11 including, respectively, first regions 11$a$ in which dysprosium (Dy) is not present and second regions 11$b$ surrounding the first regions 11$a$.

The dielectric grain 11 may have a perovskite structure represented by ABO$_3$.

In the perovskite structure represented by ABO$_3$, "A" may include one or more selected from the group consisting of barium (Ba), strontium (Sr), lead (Pb), and calcium (Ca), but is not limited thereto.

In the perovskite structure represented by ABO$_3$, "B" is not particularly limited, but may be any material that may be positioned at the B-site in the perovskite structure and may include, for example, one or more selected from the group consisting of titanium (Ti) and zirconium (Zr).

The dielectric grain may include one or more selected from the group consisting of Ba$_m$TiO$_3$ (0.995≤m≤1.010), (Ba$_{1-x}$)$_m$(Ti$_{1-y}$Zr$_y$)O$_3$ (0.995≤m≤1.010, and 0<y≤0.20), and Ba$_m$(Ti$_{1-x}$Zr$_x$)O$_3$ (0.995≤m≤1.010 and x≤0.10) or Ba$_m$TiO$_3$ (0.995≤m≤1.010), (Ba$_{1-x}$Ca$_x$)$_m$(Ti$_{1-y}$Zr$_y$)O$_3$ (0.995≤m≤1.010, 0≤x≤0.10, and 0<y≤0.20), and Ba$_m$(Ti$_{1-x}$Zr$_x$)O$_3$ (0.995≤m≤1.010 and) x≤0.10) in which one or more of the rare earth elements are partially solid-dissolved, but is not limited thereto.

Recently, as electronic products have become miniaturized and multifunctional, multilayer ceramic capacitors have tend to be miniaturized and multifunctionalized. Therefore, there has been demand for a multilayer ceramic capacitor with a small size and large capacitance.

One way to simultaneously accomplish miniaturization and increase the capacitance of the multilayer ceramic capacitor, is to increase the number of dielectric layers and electrode layers stacked in the multilayer ceramic capacitor by decreasing the thicknesses of the dielectric layers and the electrode layers. However, in a multilayer ceramic capacitor with thin dielectric layers and electrode layers, it has become important to secure withstand voltage characteristics of the dielectric layer and reduce the defect rate caused by deterioration of insulation resistance of the dielectric.

In order to solve such a problem, a method capable of securing high reliability in terms of a composition of the dielectric as well as a structure of the multilayer ceramic capacitor has been required.

In order to solve a problem of decreased reliability, dielectric grains that use an oxide having a perovskite structure in which a rare earth element is completely solid-dissolved as a base material may be used.

That is, in order to solve problems such as short-circuits, reliability defects, and the like, due to decreasing the thickness of the dielectric layer of the multilayer ceramic capacitor, it is necessary to control the content distributions of the rare earth elements in the respective regions such as an inner portion, a boundary portion, and the like, of the dielectric grain having the perovskite structure.

In order to secure reliability of the dielectric layer of the multilayer ceramic capacitor, a large amount of rare earth elements such as dysprosium (Dy) are added. Dysprosium (Dy) mainly replaces an A-site of barium titanate (BaTiO$_3$) to decrease the concentration of oxygen vacancies, thereby configuring a shell region. The shell region serves as a barrier blocking a flow of electrons at the grain boundaries of dielectric grains to block a leaked current.

In order for dysprosium (Dy) to effectively decrease the concentration of oxygen vacancies and serve as a leaked current barrier, it is necessary to accurately control the concentration of dysprosium (Dy) at each position of the dielectric grain.

Referring to FIG. 4, the shortest distance between boundaries of respective first regions 11a, in which dysprosium (Dy) is not present, of two adjacent dielectric grains 11 is "L." A region "S" is within a range of ±0.2L from a halfway point along the shortest distance between the two dielectric grains. The concentration of dysprosium (Dy) in region S may be lower than the concentration of dysprosium (Dy) in the second regions 11b.

The region S corresponds to a range of ±0.2L from a point that is ½ of the shortest distance between the boundaries of the respective first regions 11a of the two adjacent dielectric grains.

Therefore, the regions refers to a region corresponding to a length of 0.4L in relation to the center of a virtual line drawn between the boundaries of the first regions 11a, in which dysprosium (Dy) is not present, of the dielectric grains 11 so as to represent the shortest distance L.

The concentration of dysprosium (Dy) in the region S may be controlled to be lower than that of dysprosium (Dy) in the second regions 11b, such that dysprosium (Dy) replaces the A-site of barium titanate (BaTiO$_3$) to decrease a concentration of oxygen vacancies. Therefore, a leaked current may be blocked to improve reliability.

According to an exemplary embodiment in the present disclosure, the concentration of dysprosium (Dy) in the region S may be 50% or less of the concentration of dysprosium (Dy) in the second regions 11b.

The concentration of dysprosium (Dy) in the region S may be controlled to be 50% or less of the concentration of dysprosium (Dy) in the second regions 11b to decrease the concentration of oxygen vacancies. Therefore, leaked current may be blocked to improve reliability.

According to an exemplary embodiment in the present disclosure, the second region 11b of the dielectric grain 11 may surround the first region 11a of the dielectric grain 11, may be a surrounding portion of the first region 11a, and may refer to a region in which dysprosium (Dy) is present.

In addition, the region S may be a region beyond grain boundaries in the dielectric grains 11, and may be determined to be in a region positioned between dielectric grains.

According to an exemplary embodiment in the present disclosure, the dielectric grain 11 may have a core-shell structure, and the first region 11a may correspond to the core of the core-shell structure.

Generally, when the dielectric grain 11 has a core-shell structure, the rare earth element, which is an additive element, may be absent from the core, or may only be present in the core at a very small amount.

Therefore, according to an exemplary embodiment in the present disclosure, the first region 11a (in which dysprosium (Dy) is not present) may correspond to the core in the core-shell structure, or may occupy a predetermined region within the core.

The second region 11b surrounding the first region 11a in which dysprosium (Dy) is not present contrasts with the first region 11a as a region in which dysprosium (Dy) is present.

Therefore, the second region 11b may correspond to the shell in the core-shell structure. However, the second region 11b surrounding the first region 11a in which dysprosium (Dy) is not present is not necessarily limited thereto, but may not coincide with the shell.

FIGS. 3 and 4 illustrate the dielectric grains 11 as having an oval shape for convenience of explanation, but the dielectric grains 11 are not limited to having the oval shape, and may have a complete spherical shape, a spherical shape that is not the oval shape, or other shapes.

The multilayer ceramic capacitor 100 according to an exemplary embodiment in the present disclosure may be a subminiature high capacitance multilayer ceramic capacitor, with dielectric layers 111 having a thickness of 0.4 μm or less and first and second internal electrodes 121 and 122 having a thickness of 0.4 μm or less. However, the thicknesses of the dielectric layer ill and the first and second internal electrodes 121 and 122 are not necessarily limited thereto.

Since the multilayer ceramic capacitor 100 according to an exemplary embodiment in the present disclosure is the subminiature high capacitance multilayer ceramic capacitor, the dielectric layer 111 and the first and second internal electrodes 121 and 122 may be formed of thin films having smaller thicknesses than those of a multilayer ceramic capacitor according to the related art. However, in a multilayer ceramic capacitor in which thin dielectric layers and electrode layers are used, it has become important to secure withstand voltage characteristics of the dielectric layer and there has been a problem with increased defect rates due to deterioration of insulation resistance of the dielectric.

Since the dielectric layer and the first and second internal electrodes included in the multilayer ceramic capacitor according to the related art have relatively greater thicknesses than those of the dielectric layer and the first and second internal electrodes included in the multilayer ceramic capacitor according to an exemplary embodiment in the present disclosure, even though concentrations of dysprosium (Dy) at each position of the dielectric grain are not controlled as in the exemplary embodiments in the present disclosure, a large problem does not occur.

However, in the multilayer ceramic capacitor in which the dielectric layers and the internal electrodes formed of thin films having a thickness of 0.4 μm or less are used as in an exemplary embodiment in the present disclosure, concentrations of dysprosium (Dy) at each position of the dielectric grain need to be controlled as in the exemplary embodiments in the present disclosure.

In exemplary embodiments in the present disclosure, the region S that is within ±0.2L from the halfway point along the shortest distance between the boundaries of respective first regions 11a (in which dysprosium (Dy) is not present) of two adjacent dielectric grains 11, has a concentration of dysprosium (Dy) that is controlled to be 50% or less of the concentration of dysprosium (Dy) in the second regions 11b. As such, even though the dielectric layer 111 and the first and second internal electrodes 121 and 122 are formed of the thin films having the thickness of 0.4 μm or less, the concentration of oxygen vacancies may be decreased. Therefore, the leaked current may be blocked to improve the reliability.

However, the thin films do not mean that the thicknesses of the dielectric layer 111 and the first and second internal electrodes 121 and 122 are 0.4 μm or less, but may conceptually include that the thicknesses of the dielectric layer and the first and second internal electrodes are smaller than those of the multilayer ceramic capacitor according to the related art.

The dielectric grain 11 may include a barium titanate-based main component and a dysprosium (Dy) accessory component, which is the rare earth element as described above, and may further include magnesium (Mg) and aluminum (Al) as additional accessory components.

The dielectric grain may include barium titanate (BaTiO$_3$) as a base material main component, and may include magnesium (Mg) of which a content exceeds 0 mol and is 1.0 mol or less based on 100 mol of the base material main component.

Generally, it has been known that a magnesium (Mg) oxide is added to barium titanate to control grain growth of the dielectric grain.

That is, it has been known that when a content of the magnesium (Mg) oxide added to the barium titanate is large, the grain growth of the dielectric grain is suppressed, and when a content of the magnesium (Mg) oxide added to the barium titanate is small, abnormal grain growth particles are generated.

However, the content of magnesium (Mg) that may effectively control the grain growth of the dielectric gain has not been particularly known.

According to an exemplary embodiment in the present disclosure, as described above the dielectric grain 11 may include magnesium (Mg) of which the content exceeds 0 mol and is 1.0 mol or less based on 100 mol of the base material main component, in order to improve reliability and secure high capacitance.

When the content of magnesium (Mg) included in the dielectric grain 11 is 0 mol based on 100 mol of the base material main component, the dielectric grain in each region may be excessively grown, which can decrease reliability may be decreased and thwart attainment of the required target capacitance.

On the other hand, when the content of magnesium (Mg) included in the dielectric grain 11 exceeds 1.0 mol based on 100 mol of the base material main component, the grain growth of the dielectric grain may be excessively suppressed, such that it may be difficult to secure the desired capacitance.

The dielectric grain 11 may further include aluminum (Al) as an accessory component element.

The dielectric grain 11 may include barium titanate (BaTiO$_3$) as the base material main component, and may include aluminum (Al) of which the content exceeds 0 mol and is 4.0 mol or less based on 100 mol of the base material main component.

Aluminum (Al) may serve to decrease the sintering temperature of the multilayer ceramic capacitor in which the dielectric composition is used and improve the high-temperature withstand voltage characteristics of the multilayer ceramic capacitor.

When the content of aluminum (Al) exceeds 4.0 mol based on 100 mol of the base material main component, problems such as deterioration of sinterability and density, secondary phase formation, and the like, may occur, which is not preferable.

The dielectric grain 11 may include rare earth elements other than dysprosium (Dy) as accessory components.

The rare earth elements other than dysprosium (Dy) may be at least one of Y, Ho, Er, Gd, Ce, Nd, Pm, Eu, Tb, Tm, Yb, Lu, and Sm.

These rare earth elements may serve to prevent decreased reliability of the multilayer ceramic capacitor.

The content of at least one rare earth element of Y, Ho, Er, Gd, Ce, Nd, Pm, Eu, Tb, Tm, Yb, Lu and Sm, including dysprosium (Dy) may exceed 0 mol and be 4.0 mol or less based on 100 mol of the base material main component.

When the content of rare earth element exceeds 4.0 mol, there may be decreased reliability, decreased dielectric constant of the dielectric grain, and deteriorated high-temperature withstand voltage characteristics.

A multilayer ceramic capacitor 100 according to another exemplary embodiment in the present disclosure may include a ceramic body 110 including first and second internal electrodes 121 and 122 facing each other with dielectric layers 111 interposed therebetween. The dielectric layers 111 include dielectric grains 111 having a core-shell structure. The dielectric grains 111 may include first regions 11a which are present in the cores and in which dysprosium (Dy) is not present and second regions 11b outside of and surrounding the first regions 11a. Where the shortest distance between boundaries of the first regions 11a of two adjacent dielectric grains 11 is "L," the concentration of dysprosium (Dy) in a region S within ±0.2L from a halfway point along the shortest distance L is lower than the concentration of dysprosium (Dy) in the second regions 11b.

Particularly, the concentration of dysprosium (Dy) in the region S may be 50% or less of the concentration of dysprosium (Dy) in the second regions 11b.

The concentration of dysprosium (Dy) in the region S may be controlled to be 50% or less of the concentration of dysprosium (Dy) in the second regions 11b to decrease the concentration of oxygen vacancies. Therefore, the leaked current may be blocked to improve reliability.

According to another exemplary embodiment in the present disclosure, the second region 11b of the dielectric grain 11 may surround the first region 11a of the dielectric grain 11.

The region S may be a region beyond grain boundaries in the dielectric grains 11, and may be determined to be in a region positioned between one dielectric grain 11 and another dielectric grain 11.

According to another exemplary embodiment in the present disclosure, the dielectric grain 11 may have a core-shell structure, and the first region 11a in which dysprosium (Dy) is not present may be present in the core.

Generally, when the dielectric grain 11 has the core-shell structure, a rare earth element, which is an additive element, may not be present in the core. It will be understood that the rare earth element may be entirely non-existent in the core or may be in the core in a very small amount, such as an unavoidable level of the rare earth element that may be the result of including the rare earth element in the shell of the dielectric grain 11. That is, the core is essentially free of the rare earth element.

The first region 11a in which dysprosium (Dy) is not present may coincide with the core in the core-shell structure, or may occupy a predetermined region in the core.

The second region 11b surrounding the first region 11a in which dysprosium (Dy) is not present may be a region contrasted with the first region 11a in which dysprosium (Dy) is not present, and may be understood as the region in which dysprosium (Dy) is present.

The second region 11b surrounding the first region 11a in which dysprosium (Dy) is not present may correspond to a shell in the core-shell structure. However, the second region 11b surrounding the first region 11a in which dysprosium (Dy) is not present is not necessarily limited thereto, but may not coincide with the shell.

Other features are the same as those of the multilayer ceramic capacitor according to the exemplary embodiment in the present disclosure described above, and a description therefor is thus omitted.

Hereinafter, a method of manufacturing a multilayer ceramic electronic component according to an exemplary embodiment in the present disclosure will be described, but the present disclosure is not limited thereto.

In the method of manufacturing a multilayer ceramic electronic component according to an exemplary embodiment in the present disclosure, slurry including powder particles such as barium titanate ($BaTiO_3$) powder particles, or the like, may be first applied onto carrier films and dried to prepare a plurality of ceramic green sheets, resulting in dielectric layers.

The ceramic green sheet may be manufactured by preparing slurry by mixing ceramic powder particles, a binder, and a solvent with one another and manufacturing the slurry in a sheet shape having a thickness of several μm by a doctor blade method.

The ceramic powder may include $BaTiO_3$ or a main component represented by $(Ba,Ca)(Ti, Ca)O_3$, $(Ba,Ca)(Ti, Zr)O_3$, $Ba(Ti,Zr)O_3$, or $(Ba,Ca)(Ti,Sn)O_3$ in which Cr, Zr, Sn, or the like, is partially solid-dissolved. The base material main component may be included in a powder form.

The ceramic powder may include dysprosium (Dy) as an accessory component, and the content of dysprosium (Dy) may exceed 0 mol and be 4.0 mol or less based on 100 mol of the base material main component.

In addition, the ceramic powder may include magnesium (Mg) as an accessory component, and the content of magnesium (Mg) may exceed 0 mol and be 1.0 mol or less based on 100 mol of the base material main component.

In addition, the ceramic powder may include aluminum (Al) as an accessory component, and the content of aluminum (Al) may exceed 0 mol and be 4.0 mol or less based on 100 mol of the base material main component.

A conductive paste for an internal electrode including 40 to 50 parts by weight of nickel powder particles having an average particle size of 0.1 to 0.2 μm may be prepared.

The conductive paste for an internal electrode may be applied onto the ceramic green sheets by a screen printing method to form the internal electrodes, and the ceramic green sheets on which internal electrode patterns are disposed were stacked to form the ceramic body 110.

The dielectric layer 111 and the first and second internal electrodes 121 and 122 in the ceramic body 100 may be manufactured to ultimately achieve thicknesses of 0.4 μm or less after sintering.

Then, the first and second external electrodes, including conductive metal and glass, may be formed on the external surfaces of the ceramic body.

The conductive metal is not particularly limited, but may be, for example, one or more selected from the group consisting of copper (Cu), silver (Ag), nickel (Ni), and alloys thereof.

The glass is not particularly limited, but may be a material having the same composition as that of a glass used to manufacture an external electrode of a general multilayer ceramic capacitor.

The first and second external electrodes may be formed on the external surfaces of the ceramic body to be electrically connected to the first and second internal electrodes, respectively.

Plating layers may be additionally formed on the first and second external electrodes.

The plating metal is not particularly limited, but may be, for example, one or more selected from the group consisting of nickel (Ni), tin (Sn), and alloys thereof.

According to an exemplary embodiment in the present disclosure, the concentration of dysprosium (Dy) in the region S within ±0.2L from the halfway point along the shortest distance L between the boundaries of the first regions 11a (in which dysprosium (Dy) is not present) of two adjacent dielectric grains 11 in the dielectric layer 111 may be controlled to be 50% or less of the concentration of dysprosium (Dy) in the second regions 11b to decrease the concentration of oxygen vacancies. Therefore, the leaked current may be blocked to improve the reliability.

As set forth above, according to the exemplary embodiment in the present disclosure, the concentrations of dysprosium (Dy) at each position of the dielectric grain included in the dielectric layer in the ceramic body may be controlled to decrease the leaked current and suppress deterioration of an insulation resistance (IR), such that reliably may be improved.

Particularly, the concentration of dysprosium (Dy) outside the region in which dysprosium (Dy) is not present in the dielectric grain and the concentration of dysprosium (Dy) in a region within a predetermined distance between the dielectric grains may be controlled to decrease the leaked current and suppress deterioration of an insulation resistance (IR), such that reliably may be improved.

While exemplary embodiments have been shown and described above, it will be apparent to those skilled in the art that modifications and variations could be made without departing from the scope of the present invention as defined by the appended claims.

What is claimed is:

1. A multilayer ceramic capacitor comprising:
   a ceramic body including first and second internal electrodes facing each other with dielectric layers interposed therebetween; and
   first and second external electrodes on external surfaces of the ceramic body and electrically connected to the first and second internal electrodes, respectively,
   wherein the dielectric layers include dielectric grains, the dielectric grains including a first region essentially free of dysprosium (Dy) and a second region around the first regions, and
   wherein, where a shortest distance between boundaries of respective first regions of two adjacent dielectric grains is "L," a minimum concentration of dysprosium (Dy) at a point in a third region of material within ±0.2L from a halfway point along the shortest distance between the two dielectric grains is lower than a minimum concentration of dysprosium (Dy) in the second regions.

2. The multilayer ceramic capacitor of claim 1, wherein the minimum concentration of dysprosium (Dy) in the third region is 50% or less of the minimum concentration of dysprosium (Dy) in the second regions.

3. The multilayer ceramic capacitor of claim 1, wherein a first thickness of one or more of the dielectric layers is 0.4 μm or less, and a second thickness of one or more of the first and second internal electrodes is 0.4 μm or less.

4. The multilayer ceramic capacitor of claim 1, wherein the dielectric grains include magnesium (Mg).

5. The multilayer ceramic capacitor of claim 4, wherein the dielectric grains include barium titanate ($BaTiO_3$) as a base material main component, and include magnesium (Mg) of which a content exceeds 0 mol and is 1.0 mol or less based on 100 mol of the base material main component.

6. The multilayer ceramic capacitor of claim 1, wherein the dielectric grains include aluminum (Al).

7. The multilayer ceramic capacitor of claim 6, wherein the dielectric grains include barium titanate ($BaTiO_3$) as a base material main component, and include aluminum (Al) of which a content exceeds 0 mol and is 4.0 mol or less based on 100 mol of the base material main component.

8. The multilayer ceramic capacitor of claim 1, wherein the dielectric grains have a core-shell structure, with the first region being a core of the core-shell structure.

9. A multilayer ceramic capacitor comprising:
a ceramic body including first and second internal electrodes facing each other with dielectric layers interposed therebetween,
wherein the dielectric layers include dielectric grains having a core-shell structure,
wherein the dielectric grains include, respectively, first regions in cores of the core-shell structure essentially free of dysprosium (Dy) and second regions outside of the first regions and substantially surrounding the first regions, and
wherein, where a shortest distance between boundaries of the respective first regions of two adjacent dielectric grains is "L," a minimum concentration of dysprosium (Dy) at a point in a third region of material within ±0.2L from a halfway point along the shortest distance between the dielectric grains is lower than a minimum concentration of dysprosium (Dy) in the second regions.

10. The multilayer ceramic capacitor of claim 9, wherein the minimum concentration of dysprosium (Dy) in the third region is 50% or less of the minimum concentration of dysprosium (Dy) in the second regions.

11. The multilayer ceramic capacitor of claim 9, wherein a first thickness of one or more of the dielectric layers is 0.4 μm or less, and a second thickness of one or more of the first and second internal electrodes is 0.4 μm or less.

12. The multilayer ceramic capacitor of claim 9, wherein the dielectric grains include magnesium (Mg).

13. The multilayer ceramic capacitor of claim 12, wherein the dielectric grains include barium titanate (BaTiO$_3$) as a base material main component, and include magnesium (Mg) of which a content exceeds 0 mol and is 1.0 mol or less based on 100 mol of the base material main component.

14. The multilayer ceramic capacitor of claim 9, wherein the dielectric grains include aluminum (Al).

15. The multilayer ceramic capacitor of claim 14, wherein the dielectric grains includes barium titanate (BaTiO$_3$) as a base material main component, and include aluminum (Al) of which a content exceeds 0 mol and is 4.0 mol or less based on 100 mol of the base material main component.

16. A multilayer ceramic capacitor comprising:
a ceramic body including first and second internal electrodes facing each other with dielectric layers interposed therebetween; and
a non-grain region directly between a first dielectric grain and a second dielectric grain of a plurality of dielectric grains in one of the dielectric layers,
wherein the first and second dielectric grains each have a first region essentially free of dysprosium (Dy) and a second region at least partially surrounding the first region and including dysprosium (Dy), and
wherein the non-grain region includes a third region, within 30% to 70% along a shortest distance between the first region of the first dielectric grain and the first region of the second dielectric grain, having a minimum concentration of dysprosium (Dy) smaller than a minimum concentration of dysprosium (Dy) in the second region.

17. The multilayer ceramic capacitor of claim 16, wherein the minimum concentration of dysprosium (Dy) in the third region is 50% or less than the minimum concentration of dysprosium (Dy) in the second region.

18. The multilayer ceramic capacitor of claim 16, wherein the one of the dielectric layers has a thickness of 0.4 μm or less.

19. The multilayer ceramic capacitor of claim 16, wherein the first and second dielectric grains include barium titanate (BaTiO$_3$) and at least one of magnesium (Mg) or aluminum (Al).

20. A multilayer ceramic capacitor, comprising:
a plurality of first and second internal electrodes alternately stacked, in a stacking direction, with dielectric layers interposed therebetween,
wherein, in a cross-section of the multilayer ceramic capacitor taken substantially parallel to the stacking direction:
a dielectric layer between first and second internal electrodes includes anon-grain region directly between a first dielectric grain and a second dielectric grain,
the first and second dielectric grains each have outer peripheries with dysprosium (Dy), where a minimum concentration of dysprosium (Dy) in the outer peripheries is a first concentration,
the first and second dielectric grains each have cores that are essentially free of dysprosium (Dy),
the non-grain region includes a point where a minimum concentration of dysprosium (Dy) is less than the first concentration,
the point is located along a shortest line between the cores of the first and second dielectric grains, and
the point is located no closer to either of the first and second dielectric grains than 30% of a distance of the shortest line.

21. The multilayer ceramic capacitor of claim 20, wherein the minimum concentration of dysprosium (Dy) in the non-grain region is 50% or less than the first concentration of dysprosium (Dy).

22. The multilayer ceramic capacitor of claim 20, wherein the dielectric layers has a thickness of 0.4 μm or less.

23. The multilayer ceramic capacitor of claim 20, wherein the first and second dielectric grains include barium titanate (BaTiO$_3$) and at least one of magnesium (Mg) or aluminum (Al).

* * * * *